United States Patent
Ishii (10) Patent No.: US 9,123,376 B2
(45) Date of Patent: Sep. 1, 2015

(54) LINE-SHAPED MATERIAL CONVEYANCE MECHANISM, LINE-SHAPED MATERIAL CONVEYANCE METHOD, AND TAPE CONVEYANCE MECHANISM

(71) Applicant: NEC Corporation, Tokyo (JP)

(72) Inventor: Hiroaki Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/496,466

(22) Filed: Sep. 25, 2014

(65) Prior Publication Data

US 2015/0085396 A1 Mar. 26, 2015

(30) Foreign Application Priority Data

Sep. 25, 2013 (JP) .................................. 2013-197718

(51) Int. Cl.
| | | |
|---|---|---|
| G11B 15/67 | (2006.01) | |
| G11B 15/43 | (2006.01) | |
| G11B 15/66 | (2006.01) | |
| G11B 15/665 | (2006.01) | |
| B25J 9/04 | (2006.01) | |

(52) U.S. Cl.
CPC ................ *G11B 15/43* (2013.01); *G11B 15/66* (2013.01); *G11B 15/6651* (2013.01); *G11B 15/672* (2013.01); *B25J 9/04* (2013.01)

(58) Field of Classification Search
CPC .... G11B 15/06; G11B 15/65; G11B 15/6651; G11B 15/6653; G11B 15/67; G11B 15/672; B25J 9/04; B25J 9/047

USPC ......... 360/95, 93; 242/332, 332.4; 74/490.01, 74/490.03, 490.05
See application file for complete search history.

(56) References Cited

U.S. PATENT DOCUMENTS

| | | | | |
|---|---|---|---|---|
| 4,679,747 | A | * | 7/1987 | Smith .......................... 242/332.4 |
| 5,219,129 | A | * | 6/1993 | Spicer et al. ................ 242/332.1 |
| 5,542,620 | A | * | 8/1996 | Ohshita ....................... 242/332.4 |
| 5,634,377 | A | * | 6/1997 | Kimura et al. ............. 74/490.04 |
| 5,729,401 | A | * | 3/1998 | Imazaike ..................... 360/92.1 |
| 6,099,238 | A | * | 8/2000 | Tsubota ...................... 414/744.5 |
| 6,115,332 | A | * | 9/2000 | Asakura et al. ............ 369/30.35 |
| 6,708,913 | B2 | * | 3/2004 | Shimanuki .................. 242/332.4 |
| 6,883,739 | B2 | * | 4/2005 | Ojima ............................ 242/332 |
| 2004/0169101 | A1 | * | 9/2004 | Hoelsaeter et al. ......... 242/332.4 |
| 2007/0235576 | A1 | * | 10/2007 | Tsuneyoshi et al. ........ 242/332.4 |

FOREIGN PATENT DOCUMENTS

| | | |
|---|---|---|
| JP | 63-79263 | 4/1988 |
| JP | 3137776 | 12/2007 |

\* cited by examiner

*Primary Examiner* — Jefferson Evans
(74) *Attorney, Agent, or Firm* — Young & Thompson (57) ABSTRACT

A line-shaped material conveyance mechanism includes first and second support members, a guide groove, a first rotary arm, and a second rotary arm. One end of the first rotary arm is pivotally supported near the guide groove by a first rotary shaft. The other end of the first rotary arm connects one end of the second rotary arm in a state that can be rotated. A third support member is disposed on the other end of the second rotary arm. The third support member is guided and moves along the guide groove by rotating the first rotary arm around the first rotary shaft.

9 Claims, 6 Drawing Sheets

LINE-SHAPED MATERIAL CONVEYANCE MECHANISM, LINE-SHAPED MATERIAL CONVEYANCE METHOD, AND TAPE CONVEYANCE MECHANISM

This application is based upon and claims the benefit of priority from Japanese Patent Application No. 2013-197718, filed on Sep. 25, 2013, the disclosure of which is incorporated herein in its entirety by reference.

TECHNICAL FIELD

The present invention relates to a technical field of conveying a line-shaped material such as a magnetic tape, for example.

BACKGROUND ART

Recently, as a magnetic tape conveyance apparatus is miniaturized and made higher in density, a mechanism of conveying a magnetic tape to a magnetic head has become more complex. Consequently, the magnetic tape conveyance apparatus has a problem of taking much time to convey the magnetic tape. To achieve a higher density of data recorded in the magnetic tape, a magnetic material applied on the magnetic tape has been improved and changed. The conveyance apparatus is preferably configured so that the magnetic tape can be abutted on the magnetic head by contact friction appropriate for the magnetic material applied on the magnetic tape.

Patent Literature 1 (Japanese Laid-open Patent Publication No. 63-79263) discloses a magnetic tape conveyance method. In an apparatus disclosed in the Patent Literature 1, to set a state where a magnetic head can read or write a magnetic tape, a reader block of a magnetic tape cartridge is conveyed to a machine reel by a sub-arm. In the apparatus, the magnetic tape stretched between the magnetic tape cartridge and the machine reel is guided to a disposing position of the magnetic head by a main tension arm.

Patent Literature 2 (Japanese Utility Model Registration No. 3137776) discloses a magnetic tape apparatus that can perform a sure loading or unloading operation of a magnetic tape. In the apparatus disclosed in the Patent Literature 2, the magnetic tape connected between a supply reel and a take-up reel is conveyed to a position of a magnetic head by two movable guide rollers.

However, in the magnetic tape conveyance method disclosed in the Patent Literature 1, the mechanism of conveying the magnetic tape to the position where the magnetic tape can be read or written by the magnetic head is achieved by the sub-arm and the main tension arm. In the conveyance mechanism disclosed in the Patent Literature 1, arm movement goes through two steps. In other words, in the conveyance mechanism, places (areas) where the two steps can be performed are necessary due to unvariable moving distances of two types of arms. Tension of the magnetic tape is not able to be maintained so well that the magnetic tape may be cut.

Further, in the magnetic tape apparatus disclosed in the Patent Literature 2, the two movable guide rollers are necessary, and a mechanism of simultaneously operating the two guide rollers by one motive force is necessary. As a result, the number of components for the tape conveyance apparatus itself increases, thus creating a problem of a complex structure.

SUMMARY

A main object of the present invention is to provide a technology for conveying a line-shaped material to a desired position in a compact area through one step.

One aspect of the present invention of a line-shaped material conveyance mechanism includes;

first and second support members arranged on a virtual line perpendicular to one direction in a substrate parallel to the one direction, perpendicularly to the one direction and the virtual line;

a guide groove disposed, in case that the substrate is divided into two areas with the virtual line set as a reference, over a first area to a second area, in the substrate through a side of the first area side of the first and second support members;

a first rotary arm having one end pivotally supported by a first rotary shaft disposed in the second area and rotatable around the first rotary shaft; and a second rotary arm having one end rotatably connected to the other end of the first rotary arm by a second rotary shaft and including a third support member at the other end, wherein one end of the guide groove on the second support member side is disposed in the second area side, and the third support member is movable along the guide groove from the other end of the guide groove located in the first support member side to the one end located in the second support member side by rotating the first rotary arm around the first rotary shaft, and movable along the guide groove to the other end by reversely rotating the first rotary arm.

One aspect of the present invention of a tape conveyance mechanism includes;

a line-shaped material conveyance mechanism in the present invention, the line-shaped material being a magnetic tape; and a magnetic head arranged between a first support member and a second support member of the line-shaped material conveyance mechanism to perform reading from or writing to the magnetic tape.

One aspect of the present invention of a line-shaped material conveyance method includes;

arranging first and second support members on a virtual line perpendicular to one direction in a substrate parallel to the one direction perpendicularly to the one direction and the virtual line;

disposing a guide groove, in case that the substrate is divided into two areas with the virtual line set as a reference, over a first area to a second area, in the substrate through a side of the first area side of the first and second support members;

arranging a first rotary arm having one end pivotally supported by a first rotary shaft disposed in the second area and rotatable around the first rotary shaft, and a second rotary arm having one end rotatably connected to the other end of the first rotary arm by a second rotary shaft and including a third support member at the other end;

disposing one end of the guide groove on the second support member side in the second area side, thus enabling the third support member to move along the guide groove from the other end of the guide groove located in the first support member side to the one end located in the second support member side by rotating the first rotary arm around the first rotary shaft, and move along the guide groove to the other end by reversely rotating the first rotary arm; and conveying, when the third support member is located at the other end, a flexible line-shaped material disposed along a side between the third support member and the first support member to the one end on the second support member side or a vicinity thereof in a hooked state by the third support member in response to the rotation of the first rotary arm.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, the exemplary embodiments of the present invention will be described with reference to the accompanying drawings. In each exemplary embodiment described below, for easier description, it is assumed that a conveyance mechanism (conveyance structure and conveyance apparatus) according to the each exemplary embodiment is disposed in a three-dimensional space including X, Y, and Z axes.

First Exemplary Embodiment

Figure 1:
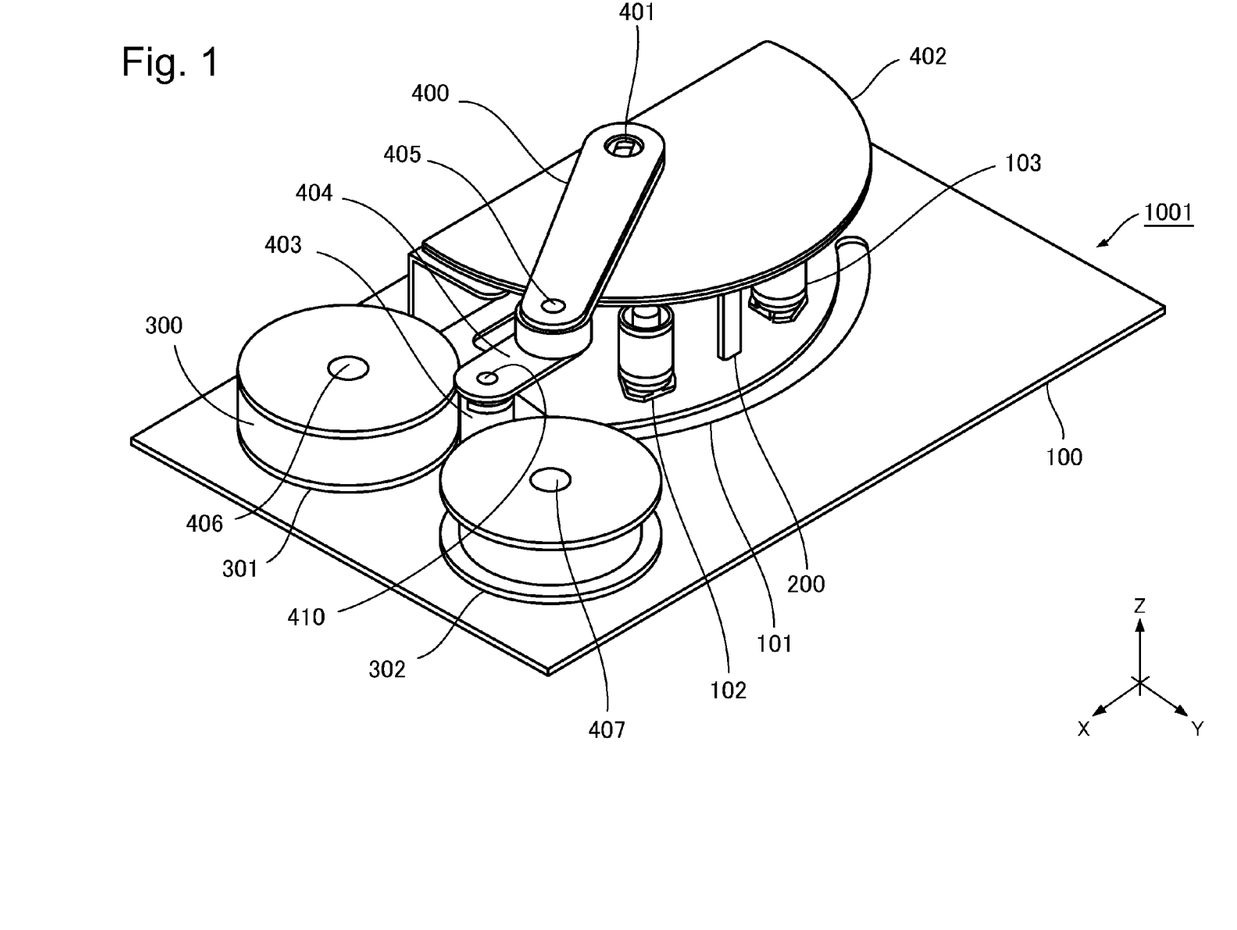
FIG. 1 is a perspective view illustrating a structure of a tape conveyance mechanism 1001 according to a first exemplary embodiment of the present invention.
Figure 2:
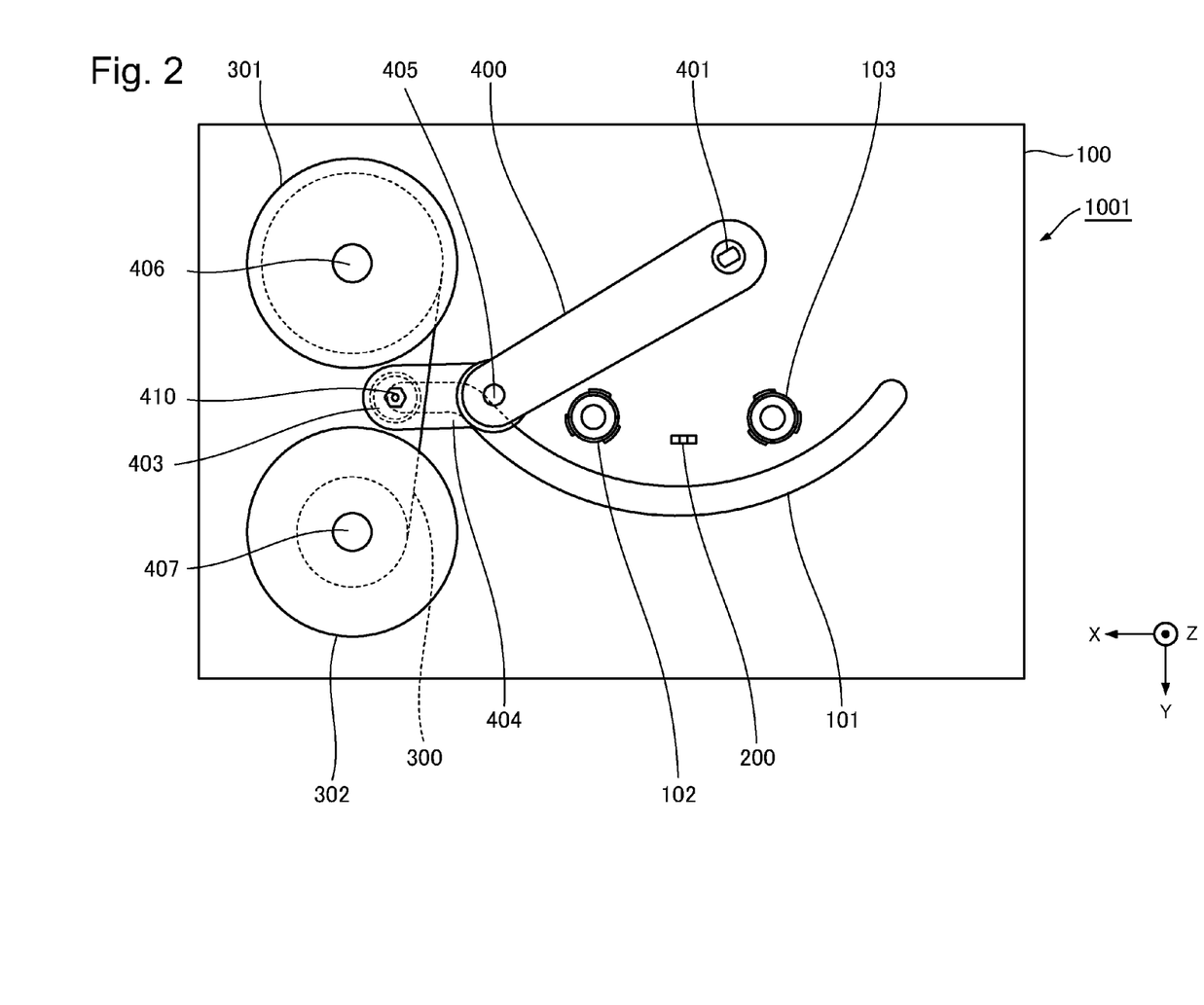
FIG. 2 is a top view illustrating the tape conveyance mechanism (in a state before tape conveyance) illustrated in FIG. 1 when seen from a Z-axis direction.

FIG. 1 is a perspective view illustrating a structure of a tape conveyance mechanism 1001 according to a first exemplary embodiment of the present invention. FIG. 2 is a top view illustrating the tape conveyance mechanism 1001 illustrated in FIG. 1 when seen from a Z-axis direction, specifically a state before tape conveyance. In FIG. 2, a pedestal 402 illustrated in FIG. 1 is omitted.

The tape conveyance mechanism 1001 illustrated in FIG. 1 is one example where all mechanisms are arranged on a substrate 100. These mechanisms may be arranged at a plurality of members in a dispersed manner instead of an integrated structure illustrated in FIG. 1 or the like as long as the mechanisms can be arranged such as illustrated in FIG. 1 or the like (similar in the respective exemplary embodiments described below).

On the substrate 100, a reel 301 is pivotally supported to be rotatable around a reel rotary shaft 406. A reel 302 is pivotally supported to be rotatable around a reel rotary shaft 407. A magnetic tape 300 is wound as an example of a flexible line-shaped material on the reel 301 and the reel 302 to serve as a cross-link (lateral bridge) between the reel 301 and the reel 302. The reel 301 and the reel 302 are arranged to sandwich one end of a guide groove 101 and spaced from each other to prevent interference with each other's rotational operation.

On the substrate 100, there are arranged a guide roller 102 serving as a first support member, a magnetic head 200 serving as a sensor, and a guide roller 103 serving as a second support member on a virtual line perpendicularly intersecting a virtual straight line connecting a center point (reel rotary shaft 406) of the reel 301 with a center point (reel rotary shaft 407) of the reel 302. The magnetic head 200 is located between the guide roller 102 and the guide roller 103. A rotary shaft of the guide roller 102 and a rotary shaft of the guide roller 103 are vertically arranged on the substrate 100.

The magnetic head 200 is movable in at least ±Z directions (directions perpendicular to the substrate 100) by a mechanism not illustrated. Accordingly, during conveyance of the magnetic tape 300 in ±X directions by the guide roller 102 and the guide roller 103, the magnetic tape 300 can slide (perform tracking) at a predetermined position, unobstructed by the magnetic head 200. As such a mechanism, a general mechanism can be employed at present. Thus, in the first exemplary embodiment, detailed description of the mechanism will be omitted.

On the substrate 100, the guide groove 101 is disposed to pass through sides of the guide roller 102, the magnetic head 200, and the guide roller 103. A feature of the guide groove 101 will be described below.

On the substrate 100, as illustrated in FIG. 1, the pedestal 402 is disposed in parallel with the substrate 100. In the first exemplary embodiment, the guide roller 102, the magnetic head 200, and the guide roller 103 are arranged between the substrate 100 and the pedestal 402.

A first rotary arm 400 has one end pivotally supported by a rotary shaft 401 that is a first rotary shaft, and is configured to be rotatable around the first rotary shaft. The rotary shaft 401 may be fixed to the pedestal 402 or the substrate 100.

A virtual straight line A (not illustrated) parallel to the virtual straight line connecting the reel 301 with the reel 302 and passing through the guide roller 102 is assumed. Furthermore, a virtual straight line B (not illustrated) parallel to the virtual straight line connecting the reel 301 with the reel 302 and passing through the guide roller 103 is assumed.

The rotary shaft 401 is located in a −Y direction of the guide roller 102, the magnetic head 200, and the guide roller 103 and between the virtual straight line A and the virtual straight line B.

One end of a second rotary arm 404 is rotatably connected to the other end of the first rotary arm 400 by a rotary shaft 405 that is a second rotary shaft. A movable guide roller 403 that is a third support member is disposed at the other end of the second rotary arm 404. The movable guide roller 403 is rotatable around a roller rotary shaft 410.

The other end of the second rotary arm 404 is a free end. Accordingly, the roller rotary shaft 410 is movable along the guide groove 101. The rotary shaft 405 is not fixed to the substrate 100. Accordingly, the rotary shaft 405 is movable to draw a locus parallel to the X axis (substrate 100) in a space above the substrate 100 according to motions of the first rotary arm 400 and the second rotary arm 404. A moving direction of the roller rotary shaft 410 is regulated by the guide groove 101, and thus a locus drawn by the roller rotary shaft 410 is also regulated according to the motions of the first rotary arm 400 and the second rotary arm 404.

In the tape conveyance mechanism 1001 according to the first exemplary embodiment, when the roller rotary shaft 410 (movable guide roller 403) is located at an end on each side of the reels 301 and 302, the magnetic tape 300 is laid between the roller rotary shaft 410 and the guide roller 102 (FIGS. 1 and 2). The tape conveyance mechanism 1001 can set the magnetic tape 300 in a state illustrated in FIG. 3 described below from this state.

Figure 3:
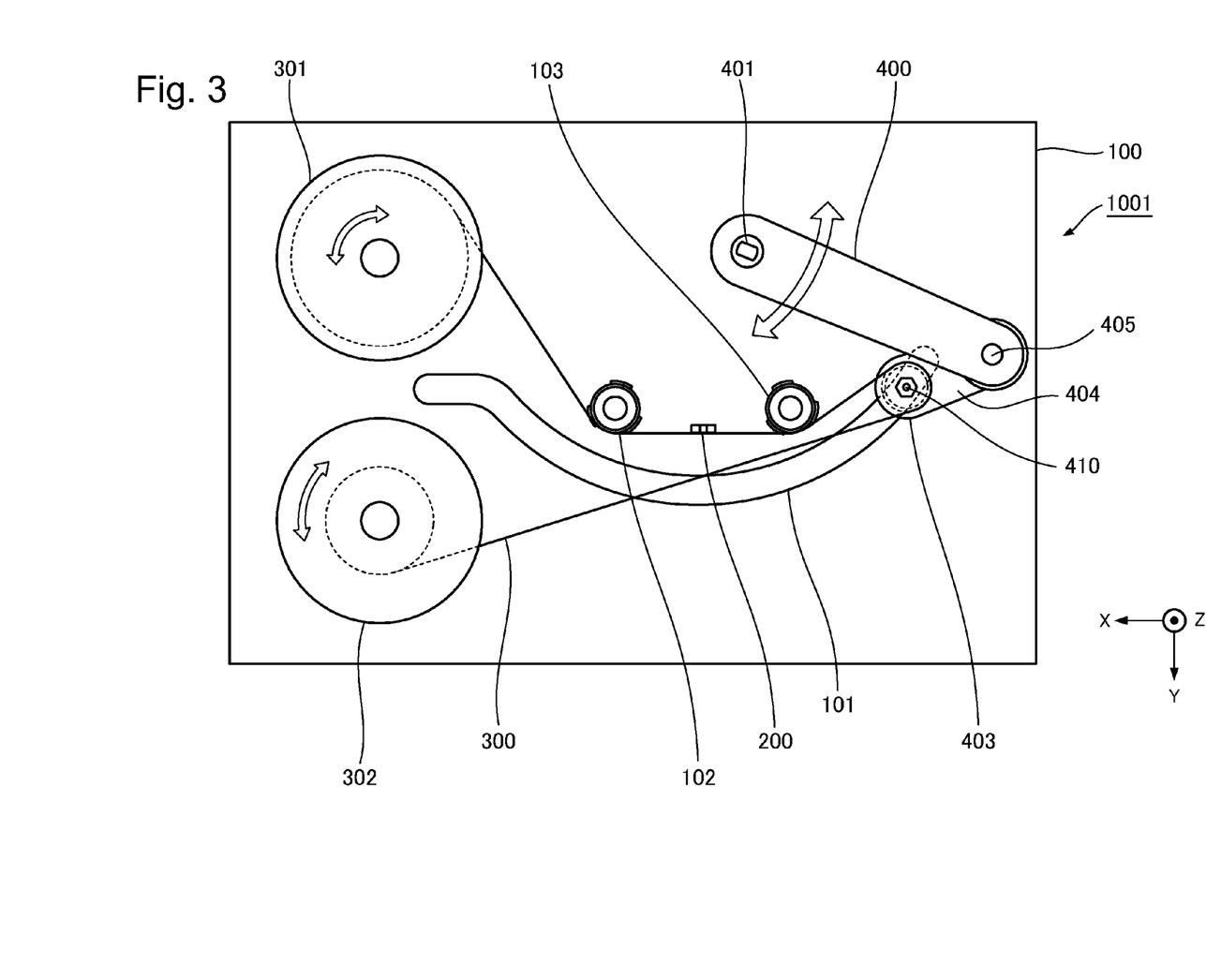
FIG. 3 is a diagram illustrating an aspect where the tape conveyance mechanism illustrated in FIG. 1 has guided a tape to a sensor position.

FIG. 3 is a top view illustrating the tape conveyance mechanism 1001 illustrated in FIG. 1 when seen from the Z-axis direction, specifically a state after the tape conveyance. In other words, the state illustrated in FIG. 3 is a state where the first rotary arm 400 has rotated around the rotary shaft 401 to move the roller rotary arm 410 (movable guide roller 403) from one end side (refer to FIG. 2) of the guide groove 101 to the other end side. In the tape conveyance mechanism 1001, the first rotary arm 400 rotates to hook the magnetic tape 300 serving as the lateral bridge between the reels 301 and 302 on the roller rotary shaft 410 (movable guide roller 403) while the roller rotary arm 410 moves from one end side (refer to FIG. 2) of the guide groove 101 to the other end side. Further, by moving to the other side of the guide groove 101 through the rotation of the first rotary arm 400, the roller rotary shaft 410 (movable guide roller 403) can convey the magnetic tape 300 to one end of the guide roller 103 side or the vicinity thereof. By this operation, a part of the magnetic tape 300 comes into contact with the magnetic head 200 between the guide roller 102 and the guide roller 103. The magnetic tape 300 is conveyed according to rotation of at least one of the reel 301 and the reel 302 to slide on a surface of the magnetic head 200 in a +X direction or a −X direction.

Further, in a state where the roller rotary shaft 410 (movable guide roller 403) is located on the other end side of the guide groove 101, the first rotary arm 400 is rotatable clockwise or anticlockwise around the rotary shaft 401. Through the rotation of the first rotary arm 400, the first rotary arm 400 and the second rotary arm 404 rotate relatively to each other around the rotary shaft 405, and an angle formed between the first rotary arm 400 and the second rotary arm 404 changes. Thus, the tape conveyance mechanism 1001 can control the magnetic tape 300 slidable to the magnetic head 200 between the guide roller 102 and the guide roller 103 to desired tension. Various technologies have been offered concerning a mechanism for rotating (driving) the first rotary arm 400 clockwise or anticlockwise around the rotary shaft 401 and a technology for controlling an operation of the tape conveyance mechanism 1001 according to the measured tension of the magnetic tape 300. In the first exemplary embodiment, any one of the technologies (mechanisms) can be employed, and detailed description thereof will be omitted (similar in the respective exemplary embodiments described below).

To achieve the aforementioned series of operations, in the first exemplary embodiment, the rotary shaft 401 is disposed at a position satisfying, for example, conditions described below.

A virtual straight line parallel to the virtual straight line connecting the reel 301 with the reel 302 and passing through the guide roller 102 is set as a virtual straight line A (not illustrated). Further, a virtual straight line parallel to the virtual straight line connecting the reel 301 with the reel 302 and passing through the guide roller 103 is set as a virtual straight line B (not illustrated). Further, a length (first distance) from the rotary shaft 401 (first rotary shaft) to one end on each side of the reels 301 and 302 of the guide groove 101 is set as a length L1. A length (second distance) obtained by adding together a distance from the rotary shaft 401 of the first rotary arm 400 to the rotary shaft 405 (second rotary shaft) and a distance from the rotary shaft 405 of the second rotary arm 404 to the roller rotary shaft 410 (third support member) is set as a length L2. A length (third distance) from the rotary shaft 401 (first rotary shaft) to one end on the guide roller 103 side of the guide groove 101 is set as a length L3.

As a first condition, as described above, the rotary shaft 401 is located in the area in the −Y direction of the guide roller 102, the magnetic head 200, and the guide roller 103 (second area side illustrated in FIGS. 4 and 5 described below) and between the virtual straight line A and the virtual straight line B. A length from the rotary shaft 401 of the first rotary arm 400 to the rotary shaft 405 (second rotary shaft) is set as a length L4.

As a second condition, in the first exemplary embodiment, the length L1 (first distance) is equal to or shorter than the length L2 (second distance). In a case that the length L1 is shorter than the length L2, as illustrated in FIG. 2, the first rotary arm 400 and the second rotary arm 404 take a convexed form in a lower side (first area side illustrated in FIGS. 4 and 5 described below).

As a third condition, in the first exemplary embodiment, the length L3 (third distance) is shorter than the length L4.

The tape conveyance mechanism 1001 according to the first exemplary embodiment can convey the magnetic tape 300 to a desired position in a compact area (occupied area) through one step. It is because of a structure where the first rotary arm 400 and the second rotary arm 404 are rotatably connected to each other by the rotary shaft 405. Accordingly, an operation range from conveyance of the magnetic tape 300 to the magnetic head 200 to permission of reading or writing with respect to the magnetic tape 300 by the magnetic head 200 can be reduced compared with that in the Patent Literature described above. Moreover, the tape conveyance mechanism 1001 can continuously complete the operation of conveying the magnetic tape 300 to the magnetic head 200 and enabling the magnetic head 200 to perform reading or writing with respect to the magnetic tape 300 through one step instead of the two steps in the Patent Literature described above.

The tape conveyance mechanism 1001 can maintain the tension of the magnetic tape 300 in an appropriate condition by controlling the rotational operation of the first rotary arm 400 in a state illustrated in FIG. 3. Thus, the tape conveyance mechanism 1001 can obtain an effect of being able to prevent the magnetic tape 300 from being cut by tension.

Second Exemplary Embodiment

Figure 4:
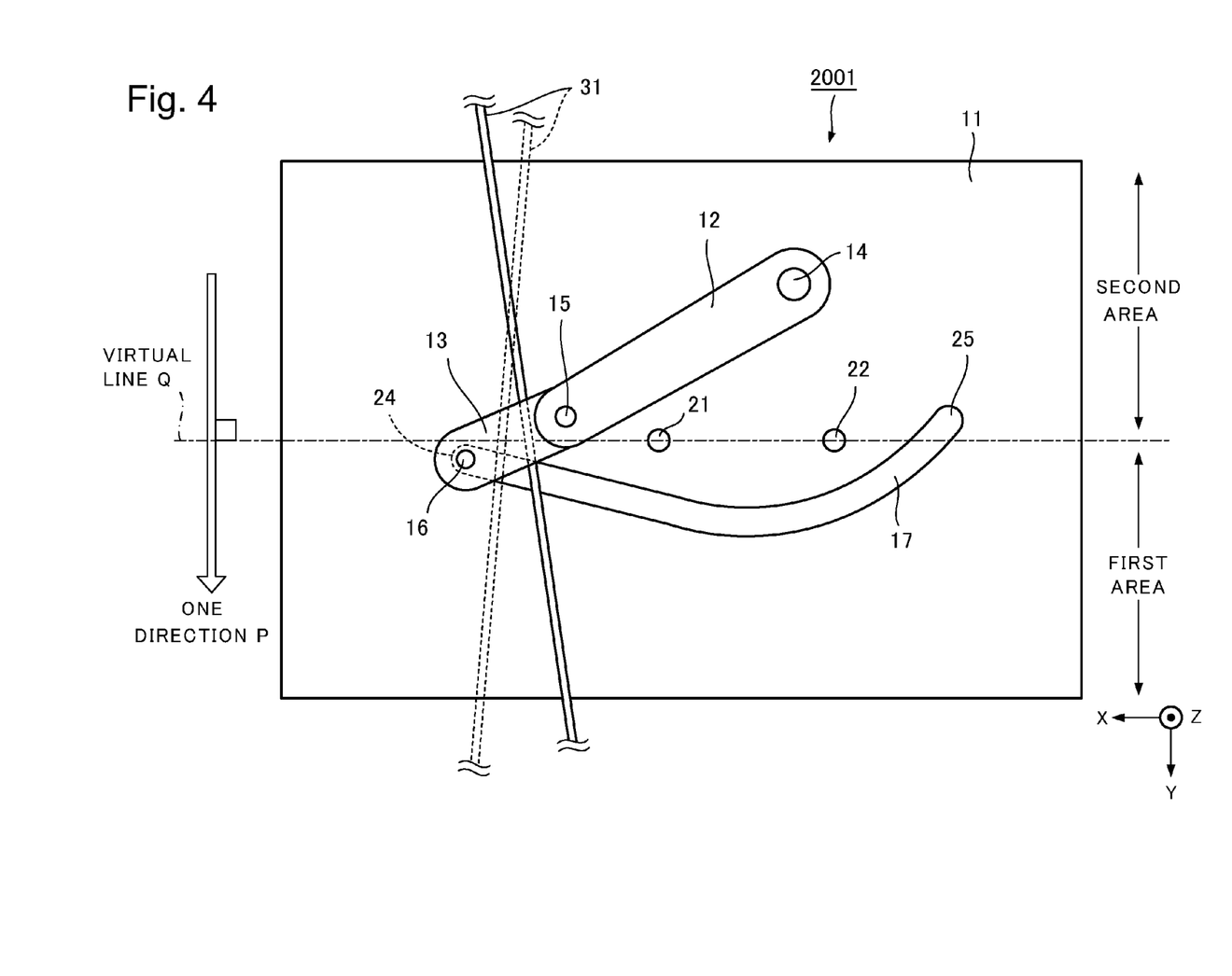
FIG. 4 is a top view illustrating a structure of a line-shaped material conveyance mechanism 2001 according to a second exemplary embodiment of the present invention.

FIG. 4 is a top view illustrating a structure of a line-shaped material conveyance mechanism 2001 according to a second exemplary embodiment of the present invention. The line-shaped material conveyance mechanism 2001 according to the second exemplary embodiment is disposed on the substrate 11.

In the second exemplary embodiment, a virtual line Q perpendicular to one direction P set as a reference is assumed on a substrate surface of a substrate 11. On the substrate 11, a first support member 21 and a second support member 22 are arranged at positions through which the virtual line Q passes perpendicularly to the reference surface.

In the second exemplary embodiment, for easier description, the substrate 11 is virtually divided into a first area and a second area with the virtual line Q set as a reference as illustrated in FIG. 4.

A guide groove 17 is disposed, over the first area to the second area, in the substrate 11 through the side of the first area side of the first support member 21 and the second support member 22.

A first rotary arm 12 is pivotally supported by a first rotary shaft 14 having one end disposed in the second area, to be rotatable around the first rotary shaft 14.

A second rotary arm 13 has one end rotatably connected to the other end of a first rotary arm 12 by a second rotary shaft 15, and includes a third support member 16 at the other end.

As illustrated in FIG. 4, in the line-shaped material conveyance mechanism 2001, one end 25 of the guide groove 17 on the second support member 22 side is disposed in the second area side. One end 24 of the guide groove 17 on the first support member 21 side is disposed in the first area side.

The third support member 16 is guided along the guide groove 17 to be movable in response to rotation of the first rotary arm 12 and the second rotary arm 13 around the first rotary shaft 14.

In the line-shaped material conveyance mechanism 2001 having the aforementioned structure, the third support member 16 can hook a flexible linear member 31 disposed along the side between the third support member 16 and the first support member 21 during the movement from one end 24 of the guide groove 17 to the other end 25. The third support member 16 can convey the linear member 31 to the second end 25 on the second support member side 22 or the vicinity thereof by moving more toward the other end 25 of the guide groove 17.

When the third support member 16 is located near the second end 25 of the guide groove 17, an intensity of a tensile force (tension) of the line-shaped material 31 by the third support member 16 can be varied by appropriately controlling a rotational direction of the first rotary arm 12. Accordingly, the line-shaped material conveyance mechanism 2001 can control (adjust) the tension of the line-shaped material 31 disposed along the side between the first support member 21 and the second support member 22 in an appropriate condition.

In other words, the line-shaped material conveyance mechanism 2001 can convey the line-shaped material 31 to a desired position in a compact area (occupied area) through one step. It is because of a structure where the first rotary arm 12 and the second rotary arm 13 are rotatably connected to each other by the rotary shaft 15. This structure makes it possible to reduce an operation range until a state where the line-shaped material 31 disposes along the side between the first support member 21 and the second support member 22 with the appropriate tensile force (tension) compared with that in the Patent Literature described above. The structure enables the operation until the state where the line-shaped material 31 disposes along the side between the first support member 21 and the second support member 22 with the appropriate tensile force (tension) to be continuously completed through one step instead of the two steps in the Patent Literature described above.

Third Exemplary Embodiment

Figure 5:
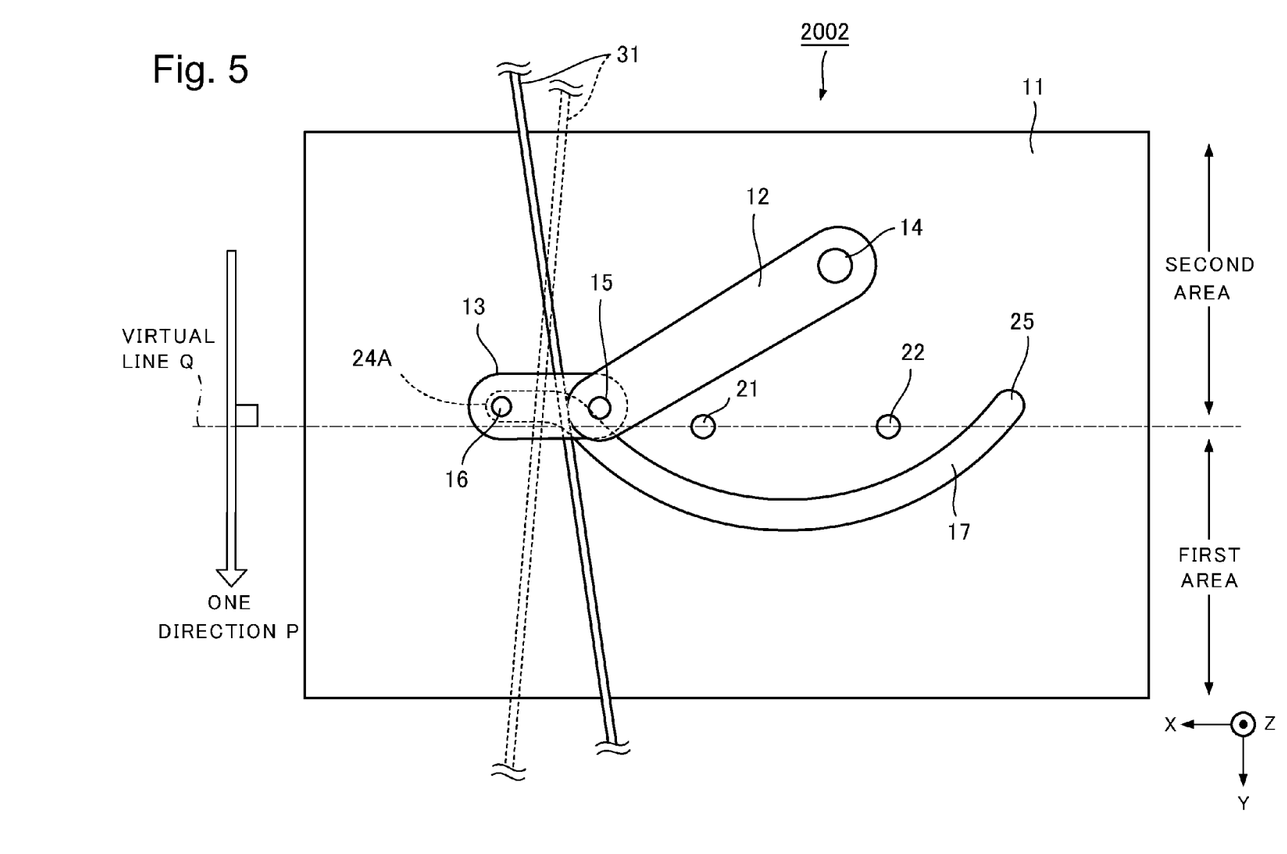
FIG. 5 is a top view illustrating a structure of a line-shaped material conveyance mechanism 2002 according to a third exemplary embodiment of the present invention.

Next, a configuration of a line-shaped material conveyance mechanism 2002 according to a third exemplary embodiment of the present invention will be described referring to FIG. 5. FIG. 5 is a top view illustrating a structure of the line-shaped material conveyance mechanism 2002 according to the third exemplary embodiment. Components of the line-shaped material conveyance mechanism 2002 same as or similar to those of the line-shaped material conveyance mechanism 2001 according to the second exemplary embodiment are denoted by the same reference numerals illustrated in FIG. 4, and repeated description will be omitted.

In the second exemplary embodiment, as illustrated in FIG. 4, one end 24 of the guide groove 17 on the first support member 21 side is located in the first area. On the other hand, in the line-shaped material conveyance mechanism 2002 according to the third exemplary embodiment, as illustrated in FIG. 5, one end 24A of the guide groove 17 on the first support member 21 side is located in the second area. A part of the guide groove 17 located in the second area is disposed along the virtual line Q. Accordingly, the third support member 16 can move in parallel with or roughly in parallel with the virtual line Q during movement from one end 24A of the guide groove 17 to the other end (second end 25).

The line-shaped material conveyance mechanism 2002 according to the third exemplary embodiment can obtain the following effects in addition to the same effects as those of the second exemplary embodiment.

In other words, one end 24A of the guide groove 17 on the first support member 21 side is located in the second area. Accordingly, the line-shaped material conveyance mechanism 2002 can control (adjust) tension of the line-shaped material 31 between the first support member 21 and the second support member 22 more surely, compared with the second exemplary embodiment.

A shape of a part near one end 24A of the guide groove 17 is formed in parallel with or roughly in parallel with the virtual line Q, and thus the line-shaped material conveyance mechanism 2002 can obtain the following effects. In other words, for example, even when a plurality of reels are disposed in one direction P as in the case of the first exemplary embodiment, the line-shaped material conveyance mechanism 2002 can achieve narrowing of a space between the reels and sure conveyance of the line-shaped material 31 by the third support member 16. In other words, in the configuration of the third exemplary embodiment, a curved part of the guide groove 17 disposed to detour around the first support member 21 and the second support member 22 can be located closer to a space between the first support member 21 and the second support member 22 compared with the guide groove 17 of the second exemplary embodiment. Thus, an occupied area (substrate 11) of the line-shaped material conveyance mechanism 2002 can be reduced compared with the second exemplary embodiment.

Other Exemplary Embodiments

Figure 6:
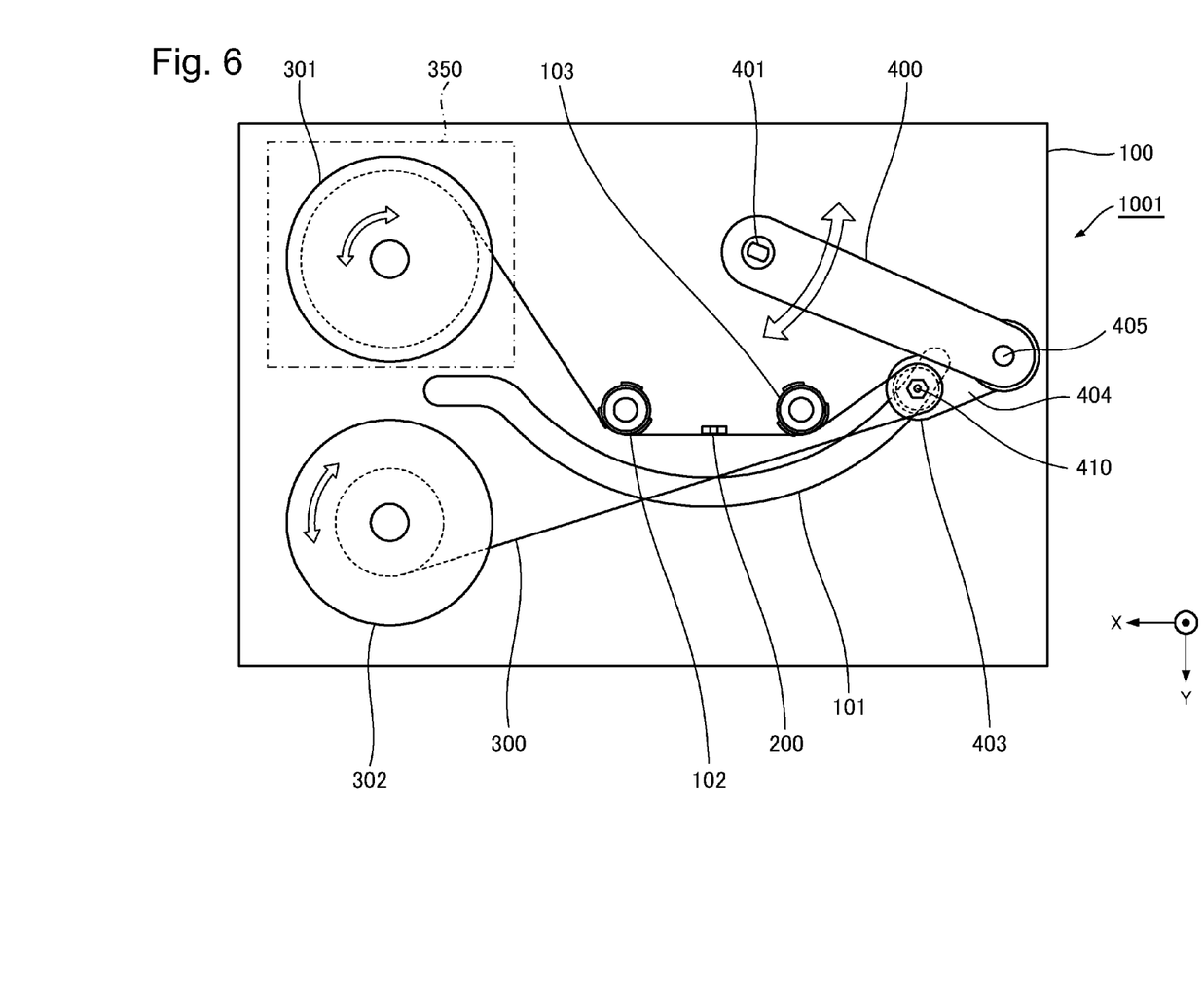
FIG. 6 is a diagram describing another exemplary embodiment of the present invention.

The present invention is not limited to the first to third exemplary embodiments. Various embodiments can be employed. For example, the first exemplary embodiment assumes a two-reel type magnetic tape cartridge (in other words, type including two reels 301 and 302 for taking up tape in cartridge). Instead, the present invention can be applied to a one-reel type magnetic tape cartridge (in other words, type including one reel for taking up tape in cartridge). For example, as an embodiment in a case that the present invention is applied to the one-reel type magnetic tape cartridge, a configuration illustrated in FIG. 6 may be cited. The configuration illustrated in FIG. 6 is a modified example of the first exemplary embodiment. In description below referring to FIG. 6, names same as those of the first exemplary embodiment are denoted by the same reference numerals, and repeated description of common portions will be omitted.

In the configuration illustrated in FIG. 6, one of reels 301 and 302 (reel 301 in this case) is a reel in a cartridge 350, while the other (reel 302) functions as a take-up reel (machine reel).

In the configuration illustrated in FIG. 6, the magnetic tape 300 pulled out from the reel 301 in the cartridge 350 by, for example, an arm (not illustrated) or the like is guided to the take-up reel 302 to be set as a lateral bridge between the reels 301 and 302. In this state, as in the case of the first exemplary embodiment, the magnetic tape 300 is conveyed to a position where the tape can be read by the magnetic head 200. Similarly, in the configuration illustrated in FIG. 6, effects similar to those of the first exemplary embodiment can be obtained.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A line-shaped material conveyance mechanism comprising:
   a first support member standing on a substrate;
   a second support member standing on the substrate spaced from the first support member,
   wherein a virtual line extends across the first and second support members, and wherein a portion of a line-shaped material is stretched between reels across an extension of the virtual line beyond the first support member;
   a first rotary arm with one end attached to a first rotary shaft standing at a fixed position on the substrate so that a second end of the first rotary arm moves across a surface of the substrate;
   a second rotary arm with one end attached to a second rotary shaft connected to the second end of the first rotary arm so that a second end of the second rotary arm moves across the surface of the substrate;
   a guide groove in the substrate, the guide groove having ends that are beyond the first and second support members and that are on a same one side of the virtual line, the guide groove crossing the virtual line so that between the first and second support members the guide groove is on a second side of the virtual line opposite the one side;
   a third support member attached to the second end of the second rotary arm and that moves along the guide groove;
   wherein the first and second rotary arms are arranged to move so that, at one of the ends of the guide groove beyond the first support member, the third support member hooks the portion of the line-shaped material stretched across the virtual line and conveys the stretched portion to an opposite one of the ends of the guide groove.

2. The line-shaped material conveyance mechanism according to claim 1, wherein a first distance from the first rotary shaft to the one of the ends of the guide groove is not greater than a second distance obtained by adding together a distance from the first rotary shaft to the second rotary shaft and a distance from the second rotary shaft to the third support member.

3. The line-shaped material conveyance mechanism according to claim 2, wherein when the first distance is shorter than the second distance.

4. The line-shaped material conveyance mechanism according to claim 1, wherein the first rotary shaft is pivotally supported between the first support member and the second support member on a side of the virtual line, between the first and second support members, opposite the guide groove.

5. The line-shaped material conveyance mechanism according to claim 1, wherein the reels are arranged to sandwich the one of the ends of the guide groove, and
   the third support member pulls the line-shaped material disposed between the reels toward the opposite one of the ends of the guide groove in response to rotation of the first rotary arm.

6. The line-shaped material conveyance mechanism according to claim 1, wherein at least one of the first to third support members includes a rotary roller configured to convey the line-shaped material.

7. A tape conveyance mechanism comprising:
   the line-shaped material conveyance mechanism according to claim 1, the line-shaped material being a magnetic tape; and
   a magnetic head arranged between a first support member and a second support member of the line-shaped material conveyance mechanism to perform reading from or writing to the magnetic tape.

8. The line-shaped material conveyance mechanism according to claim 1, wherein the opposite one of the ends of the guide groove is on the one side of the virtual line beyond the second support member and spaced from the reels.

9. A line-shaped material conveyance method comprising:
   standing a first support member on a substrate;
   standing a second support member on the substrate spaced from the first support member;
   extending a virtual line across the first and second support members;
   stretching a portion of a line-shaped material between reels across an extension of the virtual line beyond the first support member;
   attaching one end of a first rotary arm to a first rotary shaft standing at a fixed position on the substrate so that a second end of the first rotary arm moves across a surface of the substrate;
   attaching one end of a second rotary arm to a second rotary shaft connected to the second end of the first rotary arm so that a second end of the second rotary arm moves across the surface of the substrate;
   forming a guide groove in the substrate, the guide groove having ends that are beyond the first and second support members and that are on a same one side of the virtual line, the guide groove crossing the virtual line so that between the first and second support members the guide groove is on a second side of the virtual line opposite the one side;
   attaching a third support member to the second end of the second rotary arm so that the third support member moves along the guide groove;
   arranging the first and second rotary arms to move so that, at one of the ends of the guide groove beyond the first support member, the third support member hooks the portion of the line-shaped material stretched across the virtual line and conveys the stretched portion to an opposite one of the ends of the guide groove.

* * * * *